US010273879B2

(12) United States Patent
Orellana Hurtado

(10) Patent No.: US 10,273,879 B2
(45) Date of Patent: Apr. 30, 2019

(54) CIRCULAR PROPULSION JET COMPRESSOR-ENGINE

(71) Applicant: Diego Orellana Hurtado, Madrid (ES)

(72) Inventor: Diego Orellana Hurtado, Madrid (ES)

( * ) Notice: Subject to any disclaimer, the term of this patent is extended or adjusted under 35 U.S.C. 154(b) by 314 days.

(21) Appl. No.: 15/105,700

(22) PCT Filed: Dec. 15, 2014

(86) PCT No.: PCT/ES2014/000211
§ 371 (c)(1),
(2) Date: Jun. 17, 2016

(87) PCT Pub. No.: WO2015/092088
PCT Pub. Date: Jun. 25, 2015

(65) Prior Publication Data
US 2016/0305320 A1     Oct. 20, 2016

(30) Foreign Application Priority Data

Dec. 17, 2013  (ES) .................................. 201301160
Jan. 27, 2014  (ES) .................................. 201400068
(Continued)

(51) Int. Cl.
| F02C 3/16 | (2006.01) |
| F02C 3/22 | (2006.01) |
| F01D 25/04 | (2006.01) |
| F01D 25/12 | (2006.01) |
| F01D 25/32 | (2006.01) |
| F01D 25/36 | (2006.01) |

(Continued)

(52) U.S. Cl.
CPC .............. *F02C 3/165* (2013.01); *F01D 25/04* (2013.01); *F01D 25/12* (2013.01); *F01D 25/32* (2013.01);
(Continued)

(58) Field of Classification Search
CPC .... F02C 3/164; F02C 7/22; F02C 3/20; F01D 25/04; F01D 25/32; F01D 25/36; F02N 11/00; F02P 23/045
See application file for complete search history.

(56) References Cited

U.S. PATENT DOCUMENTS

| 2,404,334 A | 7/1946 | Whittle |
| 4,140,057 A | 2/1979 | Turchi et al. |
(Continued)

FOREIGN PATENT DOCUMENTS

| EP | 1548364 A2 | 6/2005 |
| ES | 2007844 A6 | 7/1989 |
(Continued)

*Primary Examiner* — Jacob Amick
(74) *Attorney, Agent, or Firm* — Browdy and Neimark, PLLC

(57) ABSTRACT

Circular propulsion jet compressor-engine, through a circular combustion chambers propellants spheroidal geometry set, generates a tangential push the turning radius and therefore resulting angular momentum about the shaft of the circle in rotation. This impulse is the consequence of the principle of action-reaction, the violent expansion that occurs inside the combustion chamber, when burning mixtures of fuel and oxidizer at high pressure, or by merging a small mass of $H_2$, encapsulated and simultaneously subjected to very high pressure, constant electromagnetic fields and high-frequency electric fields and high peak intensity. The high pressure on the oxidant or $H_2$, is achieved using the force resulting from the centripetal acceleration shaft rotating about a significant mass of a piston, solid or liquid and alternatively or cyclically. The gases and vapors produced are cooled inside the engine. In the combustion reaction, water vapor is condensed and water obtained by, pollution is retained inside the engine.

10 Claims, 4 Drawing Sheets

(30) Foreign Application Priority Data

Feb. 17, 2014 (ES) .................................. 201400114
Jul. 10, 2014 (ES) .................................. 201400560

(51) Int. Cl.
*F02C 3/20* (2006.01)
*F02C 7/22* (2006.01)
*F02N 11/00* (2006.01)
*F02P 23/04* (2006.01)
*F04B 27/06* (2006.01)

(52) U.S. Cl.
CPC ............... *F01D 25/36* (2013.01); *F02C 3/20* (2013.01); *F02C 3/22* (2013.01); *F02C 7/22* (2013.01); *F02N 11/00* (2013.01); *F02P 23/045* (2013.01); *F04B 27/06* (2013.01); *F05B 2240/52* (2013.01); *F05B 2240/54* (2013.01); *F05B 2240/61* (2013.01); *F05B 2260/211* (2013.01); *Y02T 50/676* (2013.01)

(56) References Cited

U.S. PATENT DOCUMENTS

| | | | |
|---|---|---|---|
| 4,269,658 A | 5/1981 | Ohkawa | |
| 4,333,796 A | 6/1982 | Flynn | |
| 5,282,356 A * | 2/1994 | Abell | F02C 3/165 416/21 |
| 5,408,824 A * | 4/1995 | Schlote | F01D 1/32 416/21 |
| 6,907,723 B1 * | 6/2005 | Haskins | F01D 1/32 60/39.34 |
| 2007/0214794 A1 * | 9/2007 | Tweeton | F02C 3/165 60/767 |
| 2010/0293947 A1 | 11/2010 | Chen | |
| 2017/0082022 A1 * | 3/2017 | Lee | F02K 3/062 |

FOREIGN PATENT DOCUMENTS

| | | |
|---|---|---|
| ES | 2030615 A6 | 11/1992 |
| ES | 2543809 A1 | 8/2015 |
| ES | 2545972 A1 | 9/2015 |
| ES | 2559068 A1 | 2/2016 |
| FR | 2664329 | 1/1992 |
| FR | 2905982 A1 | 3/2008 |
| WO | 9503611 A1 | 2/1995 |
| WO | 2006137723 A1 | 12/2006 |
| WO | 2012030311 A1 | 3/2012 |
| WO | 2012174621 | 12/2012 |
| WO | 2013057351 A1 | 4/2013 |

* cited by examiner

Section A-A

Section B-B

CIRCULAR PROPULSION JET COMPRESSOR-ENGINE

SECTORS OF THE ART TO WHICH THE INVENTION RELATES

The technical fields are compression of any gas, and the transformation of thermal energy into mechanical or electrical, using conventional fuels or using hydrogen in a nuclear fusion process or a combustion process with oxygen.

CURRENT STATE OF THE ART

With respect to gas compression, there are piston compressors, for the alternative displacement of a piston and a thermal or electrical engine and transmission for connecting-rod—crank, screw compressors, liquid piston, lobes (roots) and radial centrifugal or axial type and centripetal gas compressors (P8602668 dated Oct. 18, 1986, ES2002041 A6 publication dated Jan. 7, 1988). Regarding the transformation of thermal energy into mechanical or electrical the current state of the art uses internal combustion engines, alternative piston and rod-crank system, jet engines, rocket engines and gas turbines or vapor from the latter conventional fuels or nuclear fission.

In the PCT/ES2014/00211 (number of international publication WO 2015/092088 A1), priority date of the following Spanish patents is claimed: patent application P201301160, entitled "Celeste impulse engine", filled on Dec. 7, 2013; patent application P201400068 title "Drive motor propellant ceramic circular and omnidirectional" filled on Jan. 27, 2014; patent application P201400114 title of "Circular drive motor system and neutralization of flue gas" filled on Feb. 17, 2014; patent application P201400560 title "Inertial gas compressor piston" filled on Jul. 10, 2014.

Of PCT/ES201400211 and those national patents the relevant Reports on the State of the Art and the Written Opinion have been drafted. These Reports and Written Opinion of the WIPO and the SPTO have been published on dates Jun. 25, 2015; Aug. 24, 2015; Sep. 1, 2015; Sep. 17, 2015 and Feb. 10, 2016 respectively and include the state of the art in relation to this project.

Technical Problems

In reciprocating engines and turbines in jet engines, there is a limitation imposed by the performance temperature and/or the compression ratio of the oxidizer; too high values of the parameters mentioned above, needed to increase performance, are not admissible because they can break mechanisms. Engines lack directional capability to drive the vehicle. Another problem is the environmental pollution caused by the engines known in the current state of the art, due to the continued expulsion of micro-particles into the atmosphere. In nuclear fusion, their use as thermal energy is being investigated, and two problems have raised: the transfer of energy to achieve the fusion and the stability of the process.

Proposed Solutions

For internal combustion engines, (FIGS. 1, 2, 3 and 4) higher temperatures than those of the prior art are achieved by simplifying the to mechanisms in contact with the flame, limiting these to spherical combustion chambers (4), internally protected by refractory ceramic (41) and with a coated steel shell (40) having the thickness required to support hundreds of atmospheres. Newton's third law, action and reaction, is used, the hot gases exiting from the combustion chamber through an exhaust jet nozzle (39) at hypersonic speeds. Spherical combustion chambers are located in a circle, so that the thrust reaction is tangential to the radius of the mentioned circle, producing a rotational movement and a torque on the shaft (2) of the circle. To achieve an impulse capacity in any direction, a rotating inertial mass (43), that compensates the angular momentum, is mounted and the thruster are provided with a system is able to direct the output of combustion gases according to a prefixed vector. In case of an aerial vehicle, the rotation of a free wheel compensates the angular momentum. To achieve this aim, two wheels of equal spheres are mounted, supporting the rotation of one over the other, on a common shaft. A system based on a worm screw and helical gearwheel allows for modifying the verticality of the spheres wheels shaft and therefore the propulsive reaction, in relation to the horizontal symmetry plane of the motor.

The propulsion system, based on the principle of action-reaction, needs to inject a large mass of oxidizer inside the chambers to obtain a high thrust power and a high thermal efficiency, which requires injecting the oxidizer at a high or very high pressure. One solution is to incorporate a inertial piston compressor, method and mechanism by which the centripetal acceleration is used to compress the oxidizer (air) by a piston (9) inside a cylinder (10), similar to piston compressors, but without using the crankshaft and rod-crank transmission. This gas compression procedure can be applied to any other industrial activity that requires a high or a very high pressure within a rotating system or a high amount of compressed gas.

Atmospheric pollution caused by micro-particles is avoided, condensing the water vapor from combustion, through an internal heat exchanger (21). Water falls towards the bottom of the engine dragging those particles. The particles are stored in tanks (23) and later removed by the maintenance service of the equipment.

In engines using the hydrogen in a nuclear fusion process (Drawing 5, 6, 7, 8, 9 and 10) the combustion chambers (49), in which the nuclear fusion process is performed, are spherical with the interior part being protected with refractory ceramic (80) and being coated with a steel casing (81) with the thickness required to withstand thousands of atmospheres. These chambers are placed in a circle and the principle of action-reaction is used, going steam at high pressure out of the spheres. This vapor is produced by heating very quickly a liquid (Hg), this liquid completely filling the spheres under a very high pressure, due to the centrifugal is acceleration of the rotating movement of the spheres, to the density of the liquid and to the "hydrostatic column" of the turning radius. A capsule (79) with a small elongated hydrogen bubble (91), is introduced inside this liquid, by means of a differential pressure mechanism, simultaneously applying a constant magnetic field (87) and a variable RF (radio frequency) electric field, both perpendicular to each other, turning the hydrogen inside the capsule into a plasma with characteristics of inductive impedance. This process takes place because millions of charged micro particles are rotating in the plasma in the same direction but with different radius. This geometry produces a mutual inductance "L" of millionths of henrys. A power peak of the RF source, with a frequency of millions of Hz and thousands of amperes, transfers the initial fusion energy to the encapsulated hydrogen, by means of the Joule effect on th impedance of the bubble (L, ω), and by means of th increasing of the "cross section" caused by the inversion of the rotation of protons, each time the direction of the electric field changes, which forces them to exit through their rotation tangent, being some of them along the same path but in opposite directions. The process is cyclical and by pulses. The heat of fusion of the hydrogen destroys the capsule (86) and evaporates the liquid inside the sphere. This steam exits through the sphere thruster (74) provided with a shutter mechanism that opens or closes by means of differential pressure. The reaction to the expulsion of the steam keeps the turning circle of the spheres and torque of the rotation shaft, transforming the thermal energy into mechanical. The liquid vapors are condensed inside the circular heat exchanger (63) and return to the spheres for a new cycle.

Technical Advantages of the Invention

In the internal combustion engines, the invention can improve thermal performance, provides the possibility to drive a vehicle with the engine, having directional capability, and eliminates pollution caused by particles of unburned fuel (pollution), some of them being toxic.

The gas compressor with inertial piston provides advantages in performance and compression ratio for any type of gas or mixture of gas and liquid, at a high pressure and with a high volumetric displacement inside a highly revolutionized rotating, using pistons made of different materials, including liquids.

The process of nuclear fusion uses the Joule effect for the transfer of the energy fusion and does not require additional costs for the containment of the plasma, being a pulsing process, with the additional advantage of achieving a direct conversion of thermal energy into mechanical.

DETAILED DESCRIPTION OF THE INVENTION

The present invention relates to a novel process for converting thermal energy into mechanical, using conventional fuels, including hydrogen, a new method of compressing gases and their mixtures in one or more phases, a new nuclear fusion process and the required equipment for performing the procedures mentioned above.

Cirvcular Propulsion Jet Compressor Engine (FIGS. 1, 2, 3 and 4). Working with conventional fuel (gas or liquid), the compressor is provided with a vertical central shaft (2), supported on axial bearings (19) and provided with radial bearings (20) for tangential efforts. Jointly to this shaft, mechanical arms (3) are coupled and with spherical combustion chambers (4) are installed at the ends of the arms, being the combustion chambers (4) coated with refractory ceramic. An injector (5) system, for example a solenoid device, and a control system (31) inject stoichiometric amounts of fuel and oxidizer inside the combustion chambers (4). The fuel is supplied through a rotary joint (1) through one end of the central shaft (2), which is hollow in the axial direction to such effects. The oxidizer (air) is provided through the other end of the shaft, through a filter (18) and a muffler. Before being injected into the combustion chambers, combustion air is compressed to a very high pressure by means of alternative pistons (9) inside cylinders (10). The oxidizer (air) penetrates into these cylinders by a rotary joint or valve (17), located at one end of the secondary axles (8) and the intake valves (12). The pistons move transversely to the mentioned central shaft (horizontal movement), guided by a linear bearing (13), installed in the central part of the inner cylinder (10). The force that alternately displaces the pistons is equal to the product of the mass thereof and the centripetal acceleration corresponding to the turning radius of the center of mass, in relation to the central shaft. To get this, secondary axles (8), by means of axial and radial bearings, are coupled to circular platforms (6, 7). These platforms (6, 7) transmit the rotation of the central shaft (2) to the secondary axles (8), in the form of circular line, while the secondary axles (8) rotate around themselves. This last rotational movement, depending on the different versions of manufacturing, can be performed continuously in low speed engines or discontinuously for high speeds and, in this case, it may be mechanical or electromechanical. In continuous mode, the secondary axles (8) perform a slow turn around themselves, by action of sprockets (14), geared to a speed reduction system (42) which in addition engages with a circular rack or zipper (15) fixed to the support structure. In a discontinuous mode of a mechanical type, each of the secondary axles (8) forms a set of two pieces, the upper piece embracing the cylinder thus being the driven piece and the lower conductive piece. The linear bearing is of opened and it is installed with the slot towards the lower generatrix, matching a linear slot along the center of the cylinder. A rod (99) joined to the lower and central part of the piston can slide along both slots. When the piston reaches the end the compression travel, and at that moment, the strength of the centrifugal field is maximum and the rod acts against a spring to engage, by means of a clutch (100) shoe, with the two axes, transmitting the rotation of the lower shaft to the upper shaft joined to the cylinder, turning a half turn, just until the rod stops pressing the spring because the strength of the centrifugal field pushes in an opposite direction. When the piston completes a new compression displacement, the cycle is repeated. In an electromechanical discontinuous mode, the zipper (15) is not required. In this case, an electric motor fixed to the circular platform transmits the rotation to the secondary axle (8) by means of a worm screw engaged with the sprocket (14). A position detector, in each base of the cylinder, detects the piston position and generates an operation command for the motor when the piston reaches the end of its travel. Once a half turn of the cylinder has been completed, a limit switch stops the engine until a position detector in the opposite base restarts the engine.

In any of the alternative manufacturing systems, the piston performs an alternative displacement inside the cylinder and, while compressing the air on the father base of the central shaft, air is aspirated into the free space adjacent to the base of the cylinder closer to the central shaft. For a given size and mass of the piston, the volumetric displacement is directly proportional to the angular speed of the central shaft and the air compression is directly proportional to the square of the angular speed, which allows to achieve high compression ratios too. The system supports compression in more than one stage, by transversely placing two or more cylinders on the same secondary axis (8), mounted on over each other and keeping the same relative position between them when turning. Multiple stages are achieved by connecting the discharge of the compressed gas from the first stage, with the admission of the immediate superior stage and so on, until the last discharge is connected to the output rotary joint.

The compressed comburent at high pressure and temperature (effect of adiabatic compression), is conducted through rotary joints (37) to the control injection, this control injection injecting the comburent together with the fuel in stoichiometric proportions into the combustion chamber (4).

The high temperature of combustion rapidly increases the pressure inside the chambers. This causes the exit of the gas through the exhaust jet nozzle (39) shown in Drawing 3. The ejected gases are hot, since there is no temperature limitation as it happens in jet reaction engine, because a turbine is not required to drive the compressor. This fact, alongside the increased pressure of the oxidizer, allows increasing the thrust power and therefore, the thermal performance. Gases, ejected at high temperature, are not expelled directly into the atmosphere. Previously, they are cooled inside the engine through an heat exchanger (21), condensing the water vapor from the combustion and that water dragging the solid particles (pollution) from the condensed steam of the combustion engine towards the bottom (23) of the motor. Periodically they are removed in a for maintenance operation.

The engine startup requires an auxiliary electric motor to reach the angular design speed. This is performed by an auxiliary engine (27) and transmission gear (28). Non condensable gases are taken out through a catalyst muffler and an overpressure outlet system (30). The power generated is transmitted through the central shaft to a pinion gear (46), for corresponding use.

For the generation of static electricity and other uses, the motor-compressor, will be fixed by metal bases (26) and anti-vibration foundations (45) to the ground. For use in vehicles, it is necessary to compensate the angular momentum caused in the rotation in an only direction by the wheel of spheres, and so that the resulting angular momentum is the closest to zero at all times. For this system, a rotational inertial mass (43) is implemented, supported by axial bearings (44), on a sliding track which is integrated in the support arms (3) of the spheres. The inertial mass rotates freely about the central shaft (2). Before the startup, the angular momentum of the set is zero. During operation, the system consists of two rotating masses, a driving one and another free one resting on the previous mass. The principle of conservation of angular momentum will cause the free inertial mass (43) rotate opposite to the driving mass (central shaft (2) and combustion chambers (4)), so that the resultant angular momentum remains null.

In vehicles, the motor according to the invention can be used as the operating element and directional steering of the vehicle, by means of an electric motor (32), capable of changing the gas output from the exhaust jet nozzle (39), providing a radial component and a tangential component, when the spheres pass through a determined arc of circumference. The force of the radial component produces a transverse force on the rotational shaft (2) and therefore, a directional vector on the whole set.

For air transport, two wheels of spheres and thrusters on the same shaft rotate one above the other and keep the resulting angular momentum equal to zero. In this case, the common shaft is supported by a semicircular structure, supported on bearings. This structure slide on metallic guides, which allows to modify its verticality in relation to the horizontal plane of the vehicle. This modification is performed with an electric motor. This motor drives a worm screw. The set is fixed to the vehicle structure and the worm screw engages with an helical rack joined to the semicircular structure. A direction vector, introduced in the control panel, generates an order for simultaneous rotation, to the motor of the worm screw and to the electric motor of the spheres; according to the order of the control panel, the worm screw will cause the inclination of the motor shaft and the rotation of the electric motor of the spheres, so that the thrust component transversal to the shaft, has the appropriate value in the direction perpendicular to the central shaft.

The auxiliary engine (27) is reversible and can operate as an engine startup, and also when the heat engine is not able to give the power required by the shaft (46) requires, or as a power generator when the power thermal propulsion exceed the demand of the shaft (46). To achieve this aims, a tachometer (34) sends a signal to the control with the revolutions of the central shaft and there is a software designed for the maintenance of these revolutions within a narrow range. When there is a fall in the demand of power, the central shaft accelerates and the auxiliary engine (27) accelerates too; its rotor overtakes the rotating magnetic field of the stator and starts generating power, charging a battery. When the tachometer indicates a lower speed, because heat engine is not able to give the demanded power, the auxiliary engine (27) starts working as an auxiliary engine, consuming battery power and helping to maintain constant revolutions of the central shaft, similar to a hybrid engine.

The Circular Propulsion Jet Compressor Engine Working with Hydrogen in a Process of Nuclear Fusion (FIGS. 5, 6, 7, 8, 9 and 10). The engine is provided with a vertical central shaft (47), supported by radial and axial bearings (50, 51). A cylindrical and completely closed structure (53) supports the bearing caps. Metallic arms are joined to the central shaft. These arms, provided with hollow spheres at their ends, are fixed to the central shaft (47) and rest on circular rollers (52). The interior walls of the spheres are protected by means of refractory ceramics (80) and the spheres are covered by a steel or cast iron casing (81) with enough thickness to withstand the pressure of thousands of atmospheres. Both the aforementioned ceramics and the iron protections are perforated by a network of small ducts (60, 83), all hydraulically interconnected. Inside the spheres, DC coils (61) are installed. These coils close their magnetic flux crossing the end of the fine ducts that drill the spheres at their closest point to the central shaft. These ducts (88) are hydraulically connected to a tank (57), located at the top of the central shaft (47). This tank is fully enclosed and electrically insulated and it contains a high-density and high fluidity liquid (Hg or any other liquid with the same features) which is a good conductor of electricity. The tank and the liquid rotate together with the central shaft. The liquid is connected to an RF source (70) of high-frequency and a high peak intensity that is only activated by an order from the central control (72) and for a very small period of time. Concentric and together with the previous tank (57), a second tank (56) is installed, electrically isolated from the above, containing the liquid (Hg), grounded and hydraulically connected to the network of small ducts (60, 83). These ducts internally perforate the metal and the ceramic covering the spheres. The liquid completely fills the interior of the combustion chambers (49), the ducts (58, 59, 60) and the tanks (56, 57) to their level, existing electrical continuity throughout the liquid at zero potential when the engine is stopped or, if it is working, when the RF source is not activated. The fuel is prepared in capsules, shown in Drawing 10. Each of these capsules is conically shaped and perforated across its axial shaft by one fine capillary (93) which is filled, in a quantity of millionths of gram, with hydrogen and deuterium. The end of the capillary located on the smallest base of the capsule, is closed with a metallic tip (90) (steel) and the opposite end with a plug (89). Inside the sphere, the liquid pressure breaks the plug and the liquid comes into direct contact with the hydrogen, inside the capillary, compressing against the other end. The larger base of the capsule (86) is made of an insulating material of high density, resulting the larger base of the capsule heavier than the smaller one. The rest of the capsule is made of a good electrically insulating material, of low density and impermeable to hydrogen molecules.

Fuel capsules are introduced into each of the combustion chambers through a feeder (75) consisting of a system of "capsules comb" (85) similar to combs bullets from firearms. Furthermore, the feeder has a hydraulic cylinder (77) with its corresponding double effect plunger (78) and control valve (76). The hydraulic cylinder works by differential pressure. The plunger surface in contact with the liquid of the sphere is smaller than the surface inside the cylinder. If the liquid of the sphere increases its pressure, the plunger is compressed and, if it is equal at both ends, the plunger extends. When the plunger is compressed, it loads a capsule (79) in a cavity located at its end. When extending the plunger introduces the capsule (79) inside the liquid of the sphere. The centrifugal force pushes the capsules of the comb, so that the capsules (79) are introduced one by one into the cavity of the plunger, when compressing. Fuel capsules, once they have been introduced in the liquid of the capsule (79), move towards the closest part to the shaft of rotation, since their density is smaller than the density of the liquid and the whole assembly is subjected to a strong centrifugal acceleration, therefore being "embedded" as shown in drawing 9. The capsule is embedded with its metallic tip (90) in physical and electrical contact with the liquid duct (88) which is fed from the tank (57). At the very same moment when the capsule is embedded, the electrical continuity between the liquid in the fine duct (88) and the liquid of the sphere is interrupted, since the capsule has insulated walls, staying the small compressed hydrogen bubble inside the capsule, between two electrodes, one of which is the steel tip (90) of the small base, placed in the duct (88) and the other electrode is the liquid (Hg) of the sphere. The interruption of electrical continuity is the signal received by the control (72) and used to send the RF energy, in a pulsing and growing way, to the liquid (Hg) of the tank (57). The electrode tip (90) receives this RF energy through the liquid duct (58) and the duct (88). This RF energy causes an electric arc between the two electrodes of the capsule. This arc ionizes the hydrogen transforming it into plasma and the combined action of pulsed electric field of the RF and the constant magnetic field of the electromagnets, transform this plasma in an inductive impedance (induction "L" of a very small value, but the impedance $X_L$ of a significant value due to the high frequency of the alternate current of the RF source). Under this situation, a peak of high RF causes the fusion of hydrogen nucleus, due to: the Lawson criterion derived from the high compaction of the bubble nucleus during the required time; the thermal energy from the Joule effect because of the passing of an high intensive current through a resistive-inductive element; the significant increase in the cross section of the hydrogen nucleus caused by the change of the direction of rotation, which the protons and deuterons are forced to make, when the direction of the electric field changes.

The spheres have thrusters (74) for the exit of steam and hot liquid at high speed. These thrusters have shutters which open or close by differential pressure. When the pressure in the external ducts is equal to the pressure inside the sphere, the surfaces differential produces a differential pressure helping the shutter close (drawing 8). If a rapid increase of pressure occurs inside the sphere, the pressure differential is compensated and the shutter opens (drawing 7). At that very moment when a rapid temperature rise occurs, the liquid evaporates in contact with a very small point but to very high temperature produced by the nuclear fusion. This evaporation does not imply an increase of volume of liquid or a loss of energy of the bubble, since the liquid is above its critical point and the transformation from liquid to vapor is carried out at zero enthalpy, but if it involves an increase of the internal pressure in the sphere, caused by the expansion of the liquid itself and its steam and the expansion of the bubble at the point of nuclear fusion.

An increase of pressure opens the shutter and vapor and liquid go out through it at high linear velocity. At the same time new liquid enters the sphere through the ducts (83, 88) (which drill the spheres) boosted by the centrifugal force of the rotating set. This new liquid acts as an inner cooling element, evaporating and going out again through the shutter, until all of the thermal energy produced in the fusion is transformed into steam and reaction thrust in the propeller. Nuclear fusion involves dimensions of cubic millimeters, but under a temperature of about 20 million K. By expanding in the interior of the sphere, the thermal energy of the bubble expands under a very high pressure but exactly in the same way at all points of its surface, because the liquid and the surrounding vapor. The existence of differential pressure between two different points, the liquid or vapor located equidistant from the shaft of rotation within the sphere, is not possible. Energy (and temperature) associated with the fusion is distributed on this surface and increasing its value per unit area and decreasing with the square of the distance to the point of origin of the fusion. This means that when the bubble expansion reaches values of cubic centimeters in its expansion, its surface temperature reaches a value around 200 000 K, and when reaching values of cubic decimeters the temperature can be supported by the ceramic walls inside the sphere, subject to a continuous cooling process. The mechanical stability of the equipment requires a commitment of balance between the amount of hydrogen injected into the capsule, the inner dimension of the sphere and its cooling capacity.

The hot vapor and liquid exit through the exhaust nozzle with two speed components, one tangential component derived from the thermal energy associated with the fusion, which causes the engine thrust and decreases with temperature, and another radial component, associated with its inertial mass which tends to follow the curved path of the rotating system. This speed component is used to cool the hot vapors and liquids, in a heat exchanger (63) formed by iron pipes, whose interior part is protected against oxidation, through which cooling water circulates. These set of pipes are placed around the entire circular internal perimeter of the engine. The condensed and cooled vapors slide towards the bottom of the engine where they are stored and a pump (65) system elevate them to the upper tanks (56, 57).

The initial startup requires an auxiliary starter motor (54), which sets the rotary system in its design speed needed to reach the working pressure inside the spheres. The assembly acts as a large flywheel, which implies great stability in its rotation. A computer control (72) system and a specific software control operation. By means of the gear (66) and the output power shaft (67) the available energy is used.

The Circular propulsion jet compressor engine designed for nuclear fusion, can be used to transform thermal energy into mechanical and/or electrical by conventional combustion, by means of a stoichiometric mixture of hydrogen (95) and oxygen (94) prepared inside capsules of fuel, as shown in Drawing 10. In this case the liquid used is salt water, an electric conductive liquid, and as explained above, the salt water reaches the upper level of tanks (56, 57 and completely fills the ducts (58, 59) and the inner ducts (60, 88) of the spheres. Similar to the working described above, the auxiliary engine puts the mechanism according to their design revolutions, necessary to reach a pressure inside the spheres higher than a critical point of the water. Once these revolutions have been reached, the control valve of the feeder of the fuel capsules releases the plunger (78) of the feeding hydraulic cylinder (77) which, by differential pressure, moves into the liquid (salt water) of the sphere, depositing a capsule (79) in that liquid. Because of its lower density in relation to salt water and the centripetal acceleration, the capsule will move in the liquid in order to reach the duct (88) where it will be kept embedded. At this moment, the electrical continuity between the tanks (56, 57) is interrupted. When the control detects the interruption of electrical continuity between the tanks (56, 57), a pulse high voltage is emitted to the tank (57) by means of the connecting (70). This pulse reaches, through the duct (88), the electrode (96) of the capsule in contact with the liquid. As the opposite electrode plug (97) is grounded through the liquid of the sphere, an electric arc between electrodes is generated, thus providing the activation energy of the hydrogen-oxygen reaction and combustion of the mixture. With the water above its critical point, the water becomes steam inside the sphere, but its density or pressure on the flame do not change, and its volume does not change either, and enthalpy is not absorbed in the change of state, and consequently the flame does not cool. The increase in pressure inside the sphere is produced due to the violent expansion of the bubble of hydrogen and oxygen, which in the submerged combustion, it is transformed into superheated steam and thermal expansion of the water. This increase of pressure causes the opening of the shutter (82) of the jet thrusters (74) of the sphere, and water and steam at high temperature and speed exit producing a power thrust and transforming thermal energy into mechanical.

Water vapor, outside the thrusters, is condensed in the heat exchanger (63) and slides, as liquid water, towards the bottom of the storage tanks (64). A pump system raises the water level tanks and these tanks supply water to the spheres and to start a new cycle.

BRIEF DESCRIPTION AND EXPLANATION OF THE DRAWINGS

We are using the sequential numbering of the drawings shown for illustrative purposes and not limiting, for this explanation.

FIG. 1 represents a section elevation of the motor-compressor, using conventional fuel and a possible application for a vehicle. The startup must be done by an auxiliary engine (27) which, through the transmission gear (28), puts the shaft (2) according to their design revolutions. The rotary joint (1) of the hydraulic type supplies fuel. Fuel is transported through ducts drilled axially on the shaft (2) and through conduits drilled in the support (3) arms, to the injector (5). Simultaneously by the rotary joint, equipped with filter (18) muffler, at the base of the shaft (2), the air for combustion is supplied. This air passes through the conduit of the shaft (2) being connected with the valve (17), of a pneumatic and low pressure type. Through the conduit drilled axially in the secondary axles (8), the air reaches the intake valves (12) and the cylinders (10). These cylinders are integrated in the secondary axles (8) and in them, the combined action of the rotation of the shaft (2) and the axles (8) compresses the air for the combustion by the radial thrust of a piston (9), which alternatively moves horizontally, supported on a linear bearing (13) placed inside the cylinders (10). The compressed and hot air passes through discharge valves (11) and the rotary joint (37), of pneumatic type for high pressure and temperature, to the injector (5) control, and is introduced inside the combustion chamber (4) by the injector (5), in stoichiometric ratios with fuel. The electric motor (32) directs the output of combustion gases, in radial or tangential direction and within the plane containing the rotation of the spheres. The platforms (6, 7) provide support for the secondary axles (8) of the cylinders and make them circulate in rotation around the shaft (2). A nut (16), holds the sprocket (14), on the end of the axles (8). A heat exchanger (21), cools the combustion gases inside the engine enclosure, before their exit through the outlet system (30), condensing the water vapor produced. The hot water from this steam falls inside the engine to the tank (23), dragging the micro-particles (pollution) produced in the combustion engine. Covers (25) allow a periodic cleaning of the engine. An inertial mass (43), turning freely and concentrically with the shaft (2), and resting on the axial bearing (44), compensates the angular momentum of rotation of the assembly. The base (26) provides support for the thrust axial bearings (19) of the shaft (2) and the closed cylindrical chassis (24) supports in place the radial bearings (20) of radial type. The foundations (45) connect the engine to the vehicle chassis. The gear system (28, 29, 46) transmits the generated power. The control system (31) by means of a computer system and a specific software, controls the operation and receives signal from: the tachometer (34) (rpm of the central shaft), temperature control (38) of the interior temperature, electric motor (32) of the spheres, auxiliary engine (27) and control the injectors (5) in rotation, by the friction rings (35) and cables (33) power.

Figure 1:
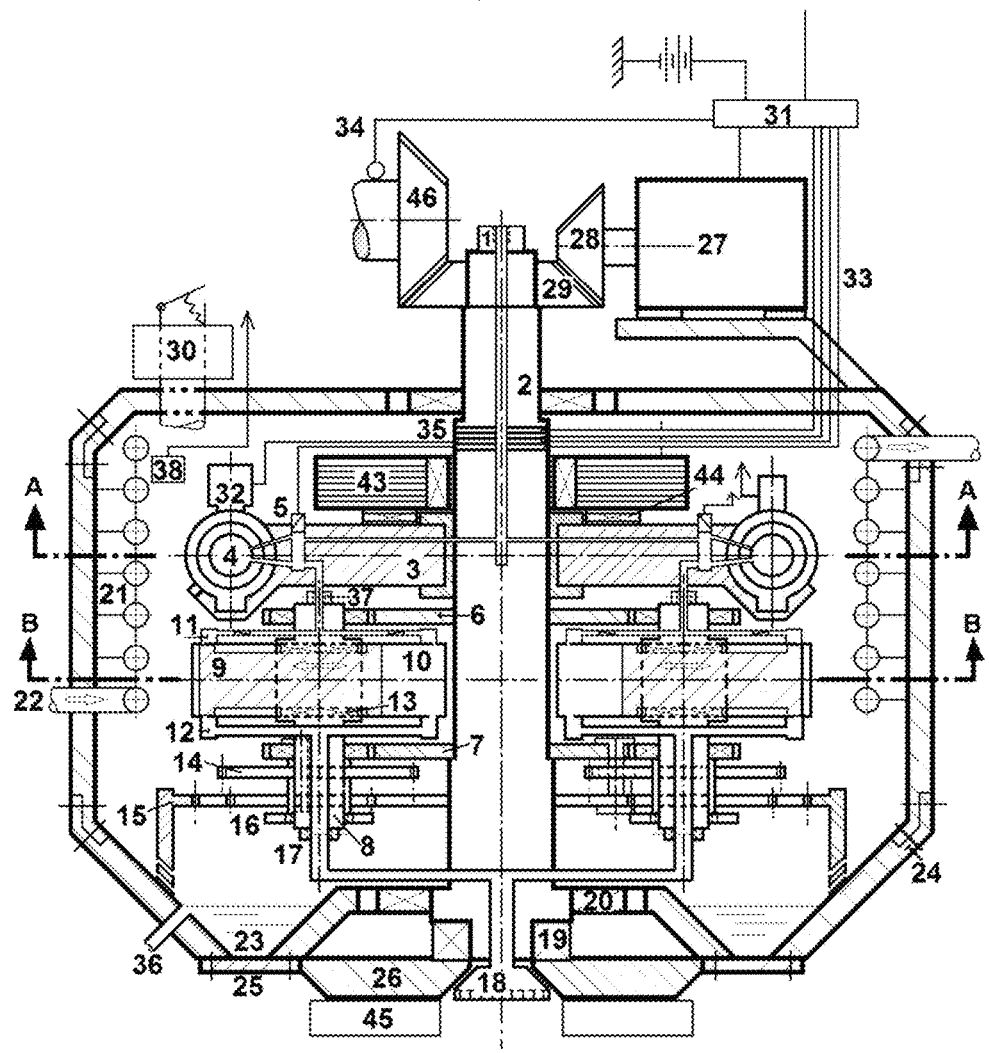
Figure 2:
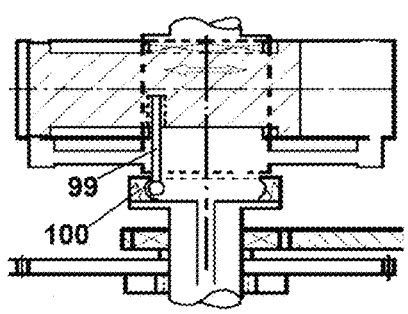
FIG. 2 shows the detail of the rotation transmission to the secondary axles (8), in mechanical and discontinuously mode. The rod (99) is threaded with the center of the piston and pushes, at the end of the compression, a circular clutch (100), engaging the bottom part of the axis with the top part.
Figure 3:
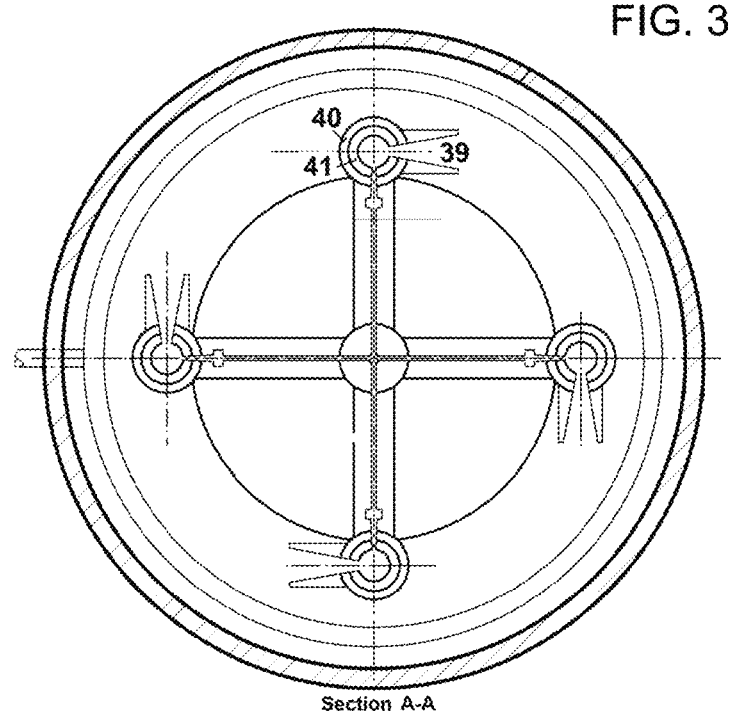
FIG. 3 represents a plant section of the engine at the height of the combustion chambers, formed by a steel shell (40) internally coated with refractory ceramic (41). The gases of combustion exit through the exhaust nozzle (39).
Figure 4:
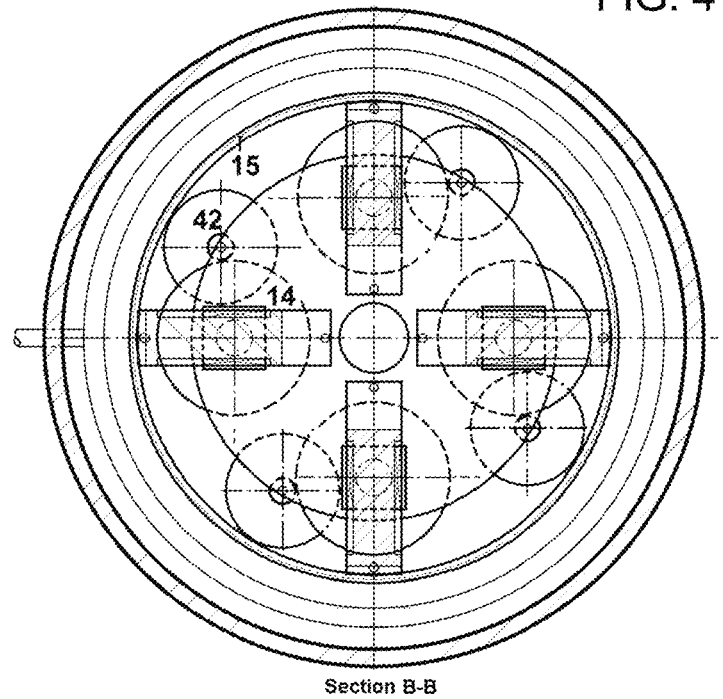

FIG. 4 It represents the sectional plant of the engine compressor air cylinders The sprocket (14) transmits the rotation to the secondary axis of the cylinder, by engaging to a reducing rate set, formed by a worm screw and the speed reduction system (42) engaging the sprocket (14) with the worm screw. The wheel with a larger diameter of this set is engaged in a metallic zipper (15) fixed to the circular support structure.

Figure 5:
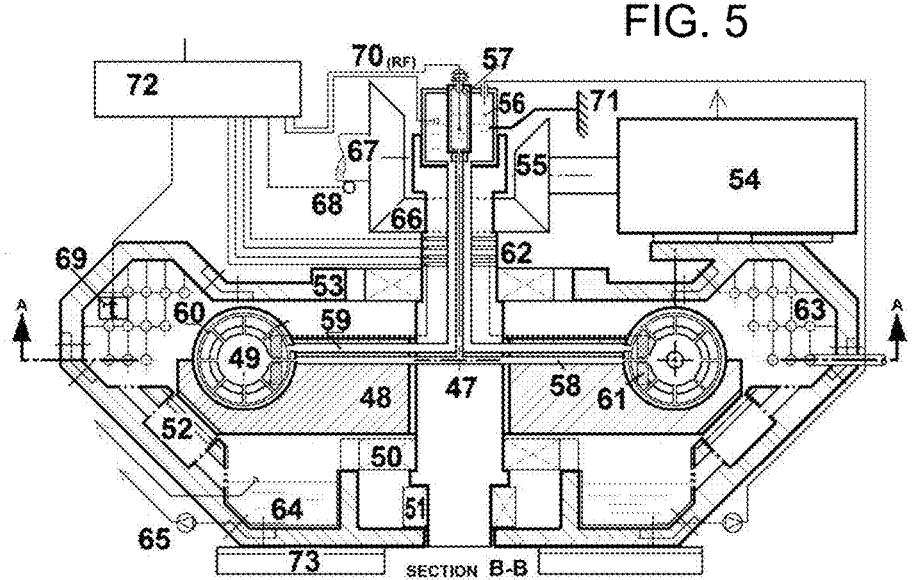

FIG. 5 is a sectional elevational view of the motor-compressor, using hydrogen as fuel and, in a possible application, in the production of electricity. Tanks (56, 57) contain mercury. This fluid fills the ducts (58, 59), which connect the tanks with the combustion chambers (49), as well as their own spheres and internal ducts (60). The electric starter motor (54) and the transmission gear (55) perform the startup, until the central shaft (47) reaches the design speed. The arms (48) are attached to the shaft. Theses arms support to the combustion chambers (49) at their ends. The axial bearings (51) of the central shaft, the radial bearings (50) of the mentioned axis and cylindrical rollers (52) support the efforts of rotation. All bearings are supported on the cylindrical metallic structure (53). The metallic cylindrical body seals the engine. A heat exchanger (63) cools the mercury vapor produced in the engine operation and liquid mercury flows to a storage tank (64) from which, pumps elevate it to the tanks (56, 57). Each sphere has a coil (61) DC connected to the control (72), through the friction rings (62). The control panel, via computer and special software controls the operation, receiving for this purpose the following parameters: the thermometer (69) signal with the internal temperature, the working of the coils (61), liquid pumps (65), the starter motor (54) and tachometer (68) revolutions signal of the output power shaft (67). RF source (70) is activated by the control. Anti-vibration foundations (73) support the engine on ground.

Figure 6:
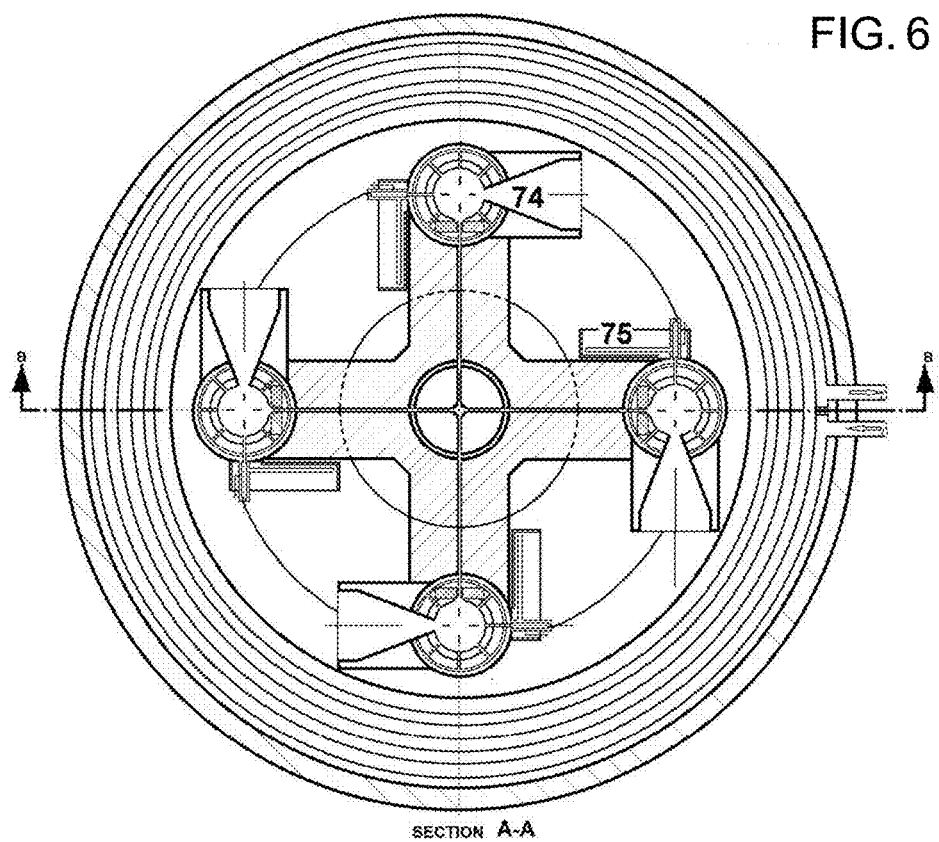

FIG. 6 represents a plant section by a horizontal plane at the height the wheel of the spheres. The thrusters (74) expel mercury vapor and liquid at a very high speed and temperature. Each sphere incorporates a fuel feeder (75) on the opposite side to the exhaust nozzle.

Figure 7:
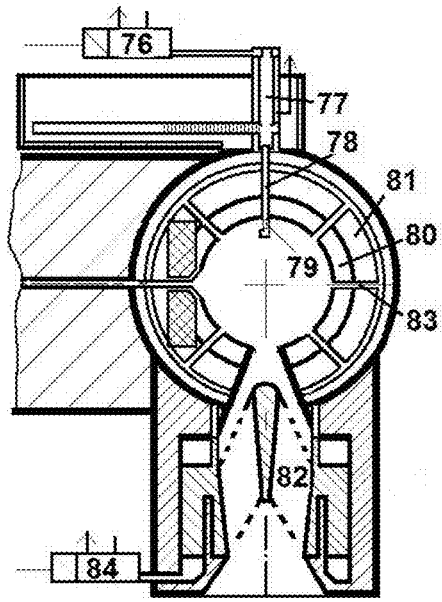

FIG. 7 represents the plant section of a sphere, and open feeder fuel propellant engine. The control valve (76) controls the actuation of the hydraulic cylinder (77) with a plunger (78) of double and differential pressure effect. A capsule (79) at the end of the plunger, deposits a small capsule, containing $H_2$ and D within the sphere filled with liquid at very high pressure. The sphere is formed by a steel casing (81) with drills made of fine diameter ducts (83), filled with fluid. The sphere has an internal coating (80) of refractory ceramics. The exhaust nozzle consists of a cylindrical body in which, internally, a hydraulic shutter can slide, controlled by the control valve (84) and acting by differential pressure.

Figure 8:
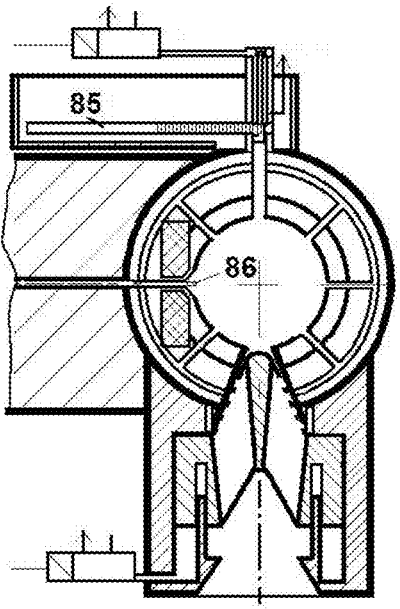

FIG. 8 represents the plant section of a sphere, fuel feeder and closed shutter of the exhaust nozzle. The fuel feeder has a capsules comb (85), ending with spring for loading one by one, the capsules inside the chamber of the plunger. When the capsule has been deposited within the sphere, due to its lower density, it moves towards a point of the sphere nearest to the rotation axis.

Figure 9:
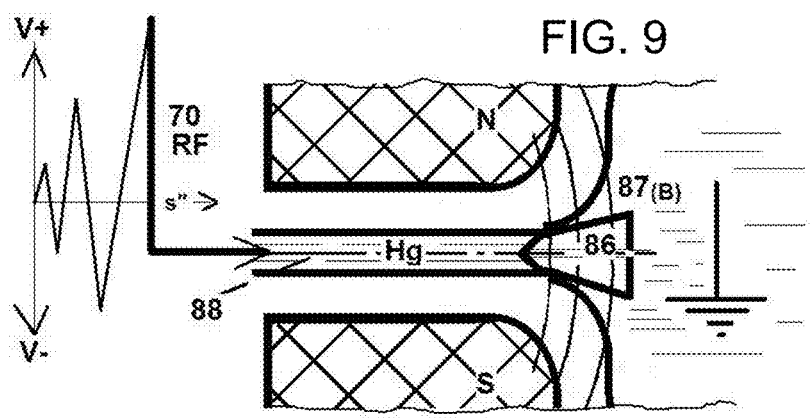

FIG. 9 is an enlarged view of the embedded capsule, a moment before the nuclear fusion. The capsule (86) interrupts the physical and electrical continuity between mercury ducts (88) connected to the RF source (70) and the grounded mercury sphere. The $H_2$ and D inside the capsule are crossed by the lines of the magnetic field (87) of the coil.

Figure 10:
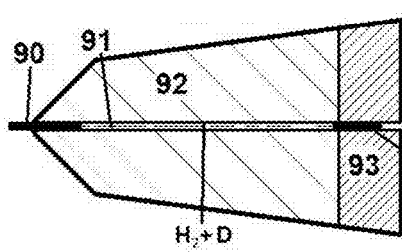

FIG. 10 represents a vertical section of a capsule of $H_2$ and D contained in a thin capillary (91). An electrode of metallic tip (90) closes the thinnest axis end and a plug (89) closes the other end. The body (92) material is electrically insulator and its center of mass lies next to the end of larger diameter.

Figure 11:
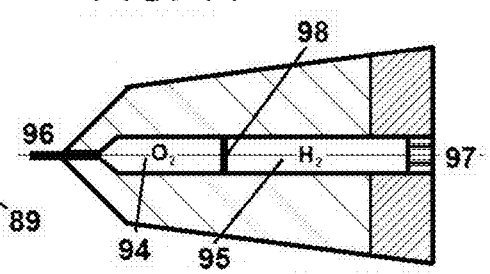

FIG. 11 represents elevation section vertical plane of a capsule of $H_2$ and $O_2$, which can be used in the same engine designed and built for nuclear fusion, replacing mercury by salt water and using a single RF voltage pulse. The $O_2$ and $H_2$ of the deposits (94, 95) are introduced into the capsule separated by a partition (98), having two spaces as a result. Two metal electrodes (96) and (97) close the two spaces mentioned above.

EXPLANATION OF A POSSIBLE METHOD OF MANUFACTURE

Manufacture of Circular Propulsion Jet Compressor-Engine Using Conventional Fuel In ceramic workshop, the interior of the spheres are made with refractory ceramic in split molds, with the necessary holes for the injection of the fuel, the oxidizer and the output of gasses. In foundry, the outer steel cover of the spheres is made with two pieces of steel. This outer steel cover closes over the ceramic pieces by means of steel screws. On the outer steel cover, drills and threads are done in their places in order to junction, on the one hand, the fuel injectors (5) and oxidizers, and on the other hand, the junction of the exhaust nozzle and the electric motor of orientation of the propulsion. At the same time, the central shaft (2) is made of steel of conical configuration and once it is machined, it receives a hard facing heat treatment. Moreover, machined axial and transverse drillings for feeding fuel and oxidizer to injectors (5) are made. The arms of the spheres (3) are made of rolled steel and joined to the central shaft by a concentric steel coil with the shaft and locked with screws to it. A washer-shaped track is placed on the arms, adjusted to the anchor coil in its internal diameter and its outside diameter is suitable for the support of the axial bearing (44).

Circular platforms (6, 7) are produced of plates of rolled steel and machined by drills for the shaft and for bearing bushes supports. On the platforms are made to a mechanical grinding for adjusting the axial bearings and threaded drills are made for mechanical connection with the central shaft. Simultaneously, the secondary axles (8) are made with axial and radial holes for input and output of the oxidizer and the connection of the valve (17) and the rotary joint (37); and the transverse drills are manufactured in the corresponding zone to support the cylinders (10). At the lower end of the axes a thread for the nut (16) is machined. This nut is attached to the sprocket (14). The cylinders (10) of the appropriate length, can be purchased in the market, because their production is standardized and the internal grinding only requires an adequate fit for the heads of the pistons (9). The pistons are made of steel and their outer surface receives a cemented treatment. The ends of the pistons, with a greater diameter than the central body, are removable and fixed to the central body by screws. These ends incorporate segments of sliding fit with the inner surface of the cylinders. The different sprockets (14) and the speed reduction system (42) and the circular zipper (15) are standard manufactured and central bores are adjusted to the diameters of the axes by machining. The chassis (24) of the whole equipment is made of rolled steel or cast iron and it has three parts: lower, middle and upper. In the middle part, the heat exchanger (21) ring is placed and being made of stainless steel tubes and connections (22) for the input and output of the cooling water of the engine. At the base of the equipment, the circular zipper (15) is installed by a metal support, and holes for the air intake are mechanized. Furthermore, at the base there are: cleaning manholes covers (25), the overflow (36) for the water from the combustion, holes which fix the radial bearing (20) on the base of the central shaft and the machining the axial bearings seat (19). On the upper body of the equipment or chassis, there are: the holes necessary to fix the outlet system (30), the muffler bracket starter auxiliary engine (27) and passage to the upper radial bearings of the central shaft (2).

The assembly starts by fixing the base (26) on the foundations (45) and placing the air intake, silencer and filter (18) on the base. Then, the lower body chassis (24) and the thrust axial bearings (19) are installed. Then radial bearings are engaged at the lower end of the central shaft. The shaft is on the thrust axial bearings (19), leaving the air inlet through the shaft joined to the air intake by sliding fit. Once this is completed, from the top of the central shaft, the lower platform (7) is inserted with its anchor steel coil into the central shaft. Each of the cylinders with their pistons and valves is placed in the transverse hole of its respective secondary axles (8) and the set is fixed on the lower platform (7), wherein the set leans against an axial bearing and is verticality maintained by the radial bearing fixed to the platform. Under the platform (7), the sprocket (14) is fixed to the secondary axles (8) with a nut (16) and the rotary joint is fixed to the air inlet valve (17). On this platform, the bearings and the speed reduction system (42) are fixed. After this, the sprocket (14) and the zipper (15) are engaged. Using standardized elements for pneumatic circuits, the air inlet of the shaft (2) is joined with the rotary joint (7). Then, the upper platform (6) is assembled by fastening screws to the steel coil of the central shaft (2). The radial bearing of the head of the shaft is assembled on the platform mentioned before. The rotary joint discharge of compressed air is installed on the upper end of the shaft. Then, a pneumatic connection is implemented between the discharge valves (11) and the rotary joint discharge of the upper end of the secondary axles (8). Once this process is completed, the arms for the support of the spheres must be assembled to the central shaft (2) with a fastening steel coil. This steel coil is introduced from the top of the shaft, sliding down until it reaches its place, resting on a step of the shaft and the coil is fixed to the shaft with screws. Injection mechanisms (injectors (5)) of standard manufacturing for oxidizer and fuel are assembled on the arms. Next, the combustion chambers (4) are fixed to the ends of the arms and the hydraulic and pneumatic connection of the injectors are made by means of hoses for high pressure and temperature, allowing some rotation of the spheres around its vertical axis and the electric motor (32) of the spheres. Then, axial bearings (44) are fitted on the sliding track of the arms, and on them the mass compensation of angular momentum of the assembly (43) provided with radial bearings that allow free rotation, concentric to the central shaft (2). Once this mounting is finished, wiring connections are made for the injectors (5), the routing engine (32) and the indoor temperature measured by the temperature control (38). The rotating elements, which require electrical connection with control, are connected to the friction rings (35). At this stage of mounting, the middle body of the equipment is assembled, being attached to the body of the base of the equipment by screws and synthetic flat gaskets for high temperature of standard manufacturing. This medium body carries inside the annular exchanger (21) heat and fittings for hydraulic connection (22) to the external cooling circuit. Next, the output connections of electric friction rings are performed and the upper body is installed on the middle body by screws and seals, closing the engine. This upper body has the following embedded elements of standard manufacturing; an outlet system (30) for non-condensable gases, catalyst of separation of 2NO in $N_2$ $O_2$, and opening gate which opens by overpressure for the expulsion of the gases produced. Furthermore, the upper body incorporates holes for the junction of the bracket bushing of the upper radial bearing of the central shaft (2) and for the junction of the starter. This starter and its transmission gear (28) are assembled with the toothed transmission pinion (29) for power output. Finally, the rotary joint (1) is assembled to the upper end of the shaft (2). The rotary joints are of standard manufacturing for automotive and aeronautics. Electric cables (33) exit from the inside of the motor through the cable gland installed and connected to the operation control system (31), ending with this operation the manufacture and assembly of the engine.

Manufacture of Circular Propulsion Jet Compressor-Engine Using Hydrogen in a Nuclear Fusion Process In ceramist workshop, the spheres are manufactured, for ceramic refractory ovens, it is the similar to market. The spheres are cast into two halves. On them, it is made: all the drills for the circulation of liquid, with outputs both outside to inside; the holes for the junctions of the electric DC coils (61) and ducts (58, 59); the seat for the fuel capsule (86) and the recess for the thrusters (74) and the recess for the plunger (78) of the feeding cylinder of the fuel capsules. Cast iron, they are modeled and melted the outer covers of ceramic pieces. These iron covers are manufactured in two halves and mechanized by means of drills that form the continuity of the network of the inner ducts (60, 83, 88), continuation of the recesses for coils (61) and ducts (58, 59). The thruster (74) is assembled in one of the halves, through screw holes for the junction with the outer body of the support. In this half a perforating drill is mechanized with grinding finish; on this drill the conical plunger (82) of the exhaust nozzle is fitted. The exhaust nozzle is manufactured in three parts: body, plunger and guide. The body is assembled on the spherical surface by means of screws and at the other end a threaded hole is mechanized for the junction of the hydraulic control valve (84) and there are threaded holes in the circular perimeter of the base, to secure by screws, the movement guides of the plunger (82). In this plunger its upper conical surface to fit over the cone of the sphere is machined, then its cylindrical surface to fit slidably machined, but snugly, in the inner surface of the body. Then it is performed a recess in the axial direction of the shaft, where the guide is coupled and remains closed the hydraulic circular enclosure. The guide fixed with screws into the threaded holes in the base of the body. On the plunger it is practiced a circular emptying following the direction of the axial axis, where the circular enclosure closing hydraulic guide will be placed. The guide is fixed by screws to the threaded holes in the base body. In the plunger, four perforating outlet holes are drilled for exit of the gasses, following a path axially. Once this work is completed, the two halves of the sphere are adjusted, and by pressure screws blockers, are joined integrally. The body of exhaust nozzle is assembled to the outer metal part of the sphere by means of iron screws. The plunger is adjusted on the inner cylindrical surface of the body and is closed with the guide piece, fixed by screws in the body. On the side of the sphere opposite the exhaust nozzle, the fuel feeder (75) is assembled on the sphere, by fixing screws on the iron surface. The fuel feeder comprises a metal body of rectangular parallelepiped form. This metal body has the capsules comb (85) and fittings of input/output of the liquid (Hg). The assembly of the fuel feeder on the sphere is made with the plunger collected in the cylinder. Simultaneously, the central shaft (47) is manufactured in two parts: main body and head, which are joined by male-female screw. Once the different diameters for adjusting the radial and axial bearings (50, 51) have been mechanized, a hard facing heat treatment is practiced on the main body and then, the concentric axial holes and the radial holes are made for two independent hydraulic ducts (58, 59). The friction rings (62) are adjusted. In the main body of the threaded bore is machined to its junction with the head of the shaft. This head, made of the same type of steel material and is larger diameter than main body. It is mechanized to accommodate at its highest end: tanks (56, 57) of liquid (Hg), the concentric bores of the extension of the hydraulic circuits, the assembly of the gear (66) and the screw fitting to the main body shaft. The tanks (56, 57) of liquid are cylindrical and made of iron. Non-through threaded are mechanized into the outer circumference of the largest tank (56), and at the upper closure cover of this tank, one bore hole with adjustment gland is mechanized, too. The tank (57) with smaller diameter is electrically insulated, by porcelain or synthetic coating, from the liquid (Hg) of bigger tank. The smaller tank is concentrically assembled to the other tank at its top by screws. A drill is performed on the upper lid of the smaller tank and a bulkhead high voltage electrical insulator is assembled. The metal support arms (48) of the spheres are made of rolled steel of high quality and adequate mechanical strength. Their outer end is mechanized in a hemisphere of the external dimension of the metal shell of the sphere and, at the bottom of that end, a plane with negative slope and constant curvature is mechanized. Steel plates for the arms are manufactured and welded together, following the curvature of the inclined plane mentioned above. Then, the plates receive a mechanized and polishing treatment of grinding and superficial cemented to the outer flat face of the curvature. They are fixed by welding, by the inner flat face, closing a circumference of the inclined plane. The chassis or engine outer structure (53), is manufactured in steel and in four parts; the base, the middle body, the upper body and the closure. The base, made of welded steel plates and with circular flat shape, is mechanized making a circular support for supporting the radial bearing (50) and making a perforation in its center. In the concentric inner face to this perforation, the surface of the seat of the axial bearing (51) is mechanized. At the bottom of the base, drills for sealed passage of the steel pipes for the pumps of elevation are made. The middle body, with circular and tilted downward sloping, is made of steel plates from which, the different parts are joined by electric welding, forming a truncated cone. On the inside inclined plane, following interior generatrix and at the center of its height, supports with trapezoidal shape are fixed. These supports have mechanized a seat for cylindrical rollers (52) and a through bore at the top at their base. The upper body is made of steel plates, giving a covering structure which continues the circular curvature of the middle body. Once welded together the different pieces, interior threaded bores are mechanized and, by steel supports, a set of steel pipes of the heat exchanger (63) are fixed. These pipes occupy the inner perimeter of the circle, forming a heat exchanger, which is integrated into the upper body. The closure is a circular flat plate mechanized with a central bore to give support to the upper radial bearing bushing and with the holes for assembling the starter motor (54) with screws. At the same time as the other work is being done, the land on which the Circular propulsion jet compressor engine will be installed is prepared by the building a bedplate of reinforced concrete, whose metal parts will join ground and the performing a mesh of deep electrodes in the circular perimeter, installed in parallel. Reinforced concrete foundation settled on lead plates and these plates lead stand on the firm ground. The assembly begins with the anchoring the base of engine chassis to the concrete bedplate. This anchoring is performed by means of bolts welded to the ironwork of the base which is welded to the grounding. Then the axial bearing (51) is installed. On this axial bearing, the main body of the central shaft (47) is left in place and after adjustment of the radial bearing it is held upright the main body of the shaft. The next step is to fix the middle body chassis to the base through with some bores and screws throughout its circular perimeter with the use of gaskets. The rollers (52) are installed in their places. The supports arms (48) are introduced from above until the tilted circular track rests on the rollers (52) and then assembled. The arms are assembled to the central shaft by a steel coil concentric with the shaft and integrally joined thereto. This junction is carried out simultaneously by screws that secure the arms, the coil of steel and the shaft itself, which is transversely drilled through a diameter and ending on the other side of the head of the screw in self-locking nut and locknut. Spheres are assembled at the ends of the support arms and the hydraulic ducts (58, 59) are connected by steel fittings of high pressure. The electrical circuits of the coils (61) are connected to the friction rings (62) by shielded conductors and protected from high temperatures. Then the upper half body is mounted. This upper half body incorporates perimeter heat exchanger (63). The upper half body is fixed by screws and gaskets around its perimeter circular on the lower half body. Then, the circular plate which closes the body of the engine is installed, and thereon, the adjustment bushing of the radial bearing of the central shaft (47). This closure is attached to the upper half body by threaded screws around its circular perimeter and gaskets. Concluded the above, it is screwed into the main part of the shaft, the shaft head, with left hand thread if the motor rotates clockwise or vice versa. The gear (66) is assembled and the liquid tanks (56, 57) of (Hg) are fixed on the head of the shaft. The starter motor (54) and mechanical transmission gear (55) with the central shaft is assembled. The assembly concludes with the hydraulic pump (65) connections to the tanks through iron pipes and with electrical connections of the friction rings (62) with control (72) center, starter motor (54) and the level signals of the tanks (56, 57), indoor thermometer (69) and the revolutions of the central shaft (67), among others.

The invention claimed is:

1. A circular propulsion jet compressor-engine, comprising a circular array of exhaust jet nozzles (39), with combustion chambers (4) of spheroidal geometry located in a circle, wherein a push tangential to the radius of the circle is generated and therefore resulting an angular momentum about a central shaft (2), being the push a result of an expansion produced by a combustion reaction inside the chambers, causing an action-reaction effect similar to a jet or jet reactor, the circular propulsion jet compressor-engine further comprising: a central shaft (2), that is perpendicular to a motor base (26) supported on radial bearings (20) and axial bearings (19) and on the base (26) structure with a cylindrical or conical geometry; a hydraulic rotary joint (1) for the fuel inlet; an air intake valve with silencer and a filter (18) for the entry of oxidizer, which penetrates through axial perforations in the central shaft (2), wherein this oxidizer can be pressurized to a determined pressure; also comprising radial bores in the central shaft (2) and ducts of fuel and oxidizer; also comprising an injector (5) system for the introduction of both fuel and oxidizer inside the combustion chambers; an ignition system inside the chambers, which may be by spark plug; hot spot by ceramic electric resistance or injection of oxidizer (air) hot; arms (3) integrated and perpendicular to the central shaft, provided at their ends with the spheroidal combustion chambers (4) with exhaust nozzle (39), forming a circle or wheel of spheres, with a refractory ceramic coating on the inner wall of each combustion chamber; a cooling system to cool gases generated in the combustion chambers and condensation of water vapor produced by a heat exchanger (21) and connections (22) for the input-output water to the exchanger; a tank (23) for collecting particles of unburned fuel alongside the condensed water; an overflow (36) output filter for clean water; covers (25) for manual removal of the polluting waste accumulated at a bottom part of the engine; an outlet system (30) for non-condensable gases, the outlet system having an outlet overpressure and with a filter, a catalyst and a muffler; a boot system formed by a bank of batteries; an electric auxiliary engine (27) and a transmission gear (28); a control system (31) via computer; an external power supply; friction rings (35) for electrical connection of the injectors with the control panel and also connected with each other; a temperature control (38) and a tachometer (34); transmission gears (28, 29) for the output of the mechanical power generated; and a seat base (26) above anti-vibration foundations (45).

2. The circular propulsion jet compressor-engine according to claim 1, which in its industrial application as engine for a traction for a sea or land transport vehicle, the engine is able to contribute to the maneuverability of the vehicle, via a directional momentum, according to a preset direction vector, in forward acceleration or deceleration, right or left, and further comprising: an inertial mass (43) installed to compensate an angular momentum of the motor; axial bearings (44) for a free and concentric rotation with the central shaft a routing system of output ejectors of the combustion gases, by means of electric motors (32) installed in the combustion chambers; a computer control with a specific software, which, among other parameters of engine working, control and command the positioning of the electric motors of the combustion chambers, the orientation of a vector impulse response according to a determined time and a determined arc of circumference in accordance with a direction vector introduced into the control.

3. The circular propulsion jet compressor-engine according to claim 1, which in its industrial application as the driving element of propulsion for any transport vehicle, is able to contribute simultaneously to the driving and the manoeuvrability upward or downward, acceleration or deceleration of the vehicle and keeping at all time zero an angular moment that is produced on the structure of the vehicle, by the turn of the wheel of spherical combustion chambers, the compressor-engine further comprising: two circular wheels of propulsion of the spherical combustion chambers on the same shaft, equipped with directional thruster electric motors (32), a central shaft common to the two wheels mentioned; one of the wheels of the spherical combustion chambers being provided with arms supported and joined to the central shaft and the other wheel of the spherical combustion chambers rotating freely on the same shaft; an axial bearing to support the wheel freely over the other; supports of the radial bearings of the central shaft on its ends, these supports being joined to helical gear zippers which form arcs of circumference whose geometric centers matching the center of symmetry of the central shaft; worm screw engaged with the gear zippers; electric motors whose axes are joined to worm screws; the electric motors being fixed to the vehicle structure; guide brackets fixed to the vehicle structure and where gear zippers can slide; electrical connections to the motors that can make them rotate in both directions; and a control system by a computer and specific software that, among other functions, controls and commands, according to a direction vector introduced in the control, the position and rotation of the motors of the worm screw and the position and rotation of the electric motors of the spherical combustion chambers.

4. A circular propulsion jet compressor-engine for supplying compressed air or gas at a high pressure using a force field of a centripetal acceleration, the acceleration, by means of a turning movement and by alternative piston with mass within a cylinder and within said field of forces, the compressor-engine comprising: a central shaft (2) and a heat engine or auxiliary engine (27) for supplying power for operation; a circular support platform which is joined to the central shaft, this support being formed by a single or several platforms (6, 7) forming a single structure; secondary axles (8) installed around the central shaft (2) and occupying vertices of a regular polygon; cylinders (10) which are integrally attached to the secondary axles (8), the cylinders being installed transversely to the secondary axles, each of the cylinders (10) comprising the piston (9); a system of linear displacement, with a sliding fit of the piston (9) inside the cylinder (10); intake valves (12) for air (gas) and discharge valves (11) of the air (gas) compressed; a chassis for protection and support mechanism, formed by a casing and closed structure (24); and an air inlet (gas) to be compressed, equipped with a filter (18) and a muffler.

5. The circular propulsion jet compressor-engine according to claim 4, which reduces energy losses due to mechanical friction, further comprising for this purpose linear bearings (13) inside the cylinders (10), an air discharge pipe (gas) compressed with rotary joints (37); a transmission gear (28, 29) of the circular movement of the auxiliary electric engine (27) to the central shaft (2); and gear sprockets (14) coupled to the secondary axles (8), the sprockets (14) directly or alternatively through a speed reduction system (42), meshing with a gear zipper (15).

6. The circular propulsion jet compressor-engine according to claim 4, which reduces energy losses due to mechanical friction, further comprising for this purpose axial bearings (19) and radial bearings (20) on the central shaft and axial and radial bearings for support of the secondary axles; an air discharge pipe (gas) compressed with rotary joints (37); a transmission gear (28) and (29) of the circular movement of the auxiliary electric engine (27) to the central shaft (2); and gear sprockets (14) coupled to the secondary axles (8), the sprockets (14) directly or alternatively through a speed reduction system (42), meshing with a gear zipper (15).

7. The circular propulsion jet compressor-engine according to claim 4 that for certain applications uses a liquid inertial piston, further comprising cylinders, whose section is not necessarily circular, and liquid pistons whose density must be greater the gas for the compression.

8. The circular propulsion jet compressor-engine according to claim 4, which can perform several compression steps on the same secondary axles (8) and further comprising several cylinders (10) on said common secondary axles (8) at different levels, wherein a cylinder discharge of the first level is connected with the a cylinder admission of an immediate superior level and so on, leaving no interconnection, with a cylinder intake located on the lower level and a discharge of the cylinder located on the upper level, being connected to their respective jacks admission air (gas) to compress and discharge of air (gas) compressed.

9. A circular propulsion jet engine through a circular array of jet thrusters (74) with combustion chambers (49) of spheroidal geometry generating a push tangential to a turning circle and therefore resulting an angular momentum about central shaft (47), the push being a consequence of the principle of action-reaction, by means of an expansion that occurs inside the combustion chambers, to fuse the nucleus of H2, inside a capsule surrounded by liquid (Hg) and subjected to high pressure, the high pressure originating field forces centripetal acceleration and compact H2 atoms, wherein a variable electric field RF (radio frequency) ionizes the H2 atoms, while a constant magnetic field passes through ions (plasma), creating in the plasma an inductive effect and a resistance to passage of current, being that current directly proportional to the RF frequency, wherein fusion occurs when, in the pre-mentioned conditions, electrical discharges of high currents are performed on ions in the capsules, wherein the circular propulsion jet engine further comprises a rotational center shaft (47), an axial bearing (51) and radial bearings (50) supported in a fully closed and sealed conical structure (53), some mechanical arms (48), joined integrally to the central shaft and supported at its ends on conical or cylindrical roller (52) bearings, wherein the combustion chambers (49), internally protected by refractory ceramics (80) with spherical covering of great thick steel casing (81) and perforated by a multitude of thin ducts and ducts (83) inside, all of them hydraulically interconnected; the engine also comprises electromagnetic coils (61) inside the combustion chambers (49), DC, closing its magnetic field on fine ducts (88) and perforating the spheres at the nearest point to the central shaft of rotation; a fuel feeder (75) capsules, fixed to each of the spheres, within which there is a capsules comb (85) and a hydraulic cylinder (77) with a double-acting plunger (78) and a control valve (76); a capsule feeding chamber at the end of the plunger and a spring, at the end of capsules comb; a steam outlet nozzle, by means of a hydraulic cylinder coupled to each of the spheres and these hydraulic cylinders has a shutter made of a perforated plunger (82) and guide movement of this plunger and a control valve (84); wherein the fuel capsules, of conical configuration, are perforated by a thin capillary (91) in its longitudinal axis and containing a charge of H2 and D inside the capillary, each capsule having a steel tip (90) closing the capillary of the capsule by a smaller base of a truncated cone and a closing plug (89) on a side of the larger base, each capsule being provided with an electrically insulating material which surrounds the capillary and whose center of gravity is next to the larger base of the capsule, wherein the engine also comprises a system of iron pipes forming an hydraulic circuit of a heat exchanger (63) in an inner circle and larger diameter perimeter of an iron envelope of a motor structure and it has fixers at both ends of the circuit connected to an external source of water; a tank (56) with liquid (Hg) in the upper end of central shaft, fine ducts which go from the tank to each sphere and these ducts are inside the central shaft and inside the support arms of the spheres and connect the liquid tank (Hg) with the thin ducts (60, 83), drilled inside the spheres, a second tank (57) of liquid (Hg), concentric with the previous one and secured to the rotating shaft, sealed and electrically insulated from the first tank, fine ducts that channel the liquid (Hg) from the tank to the spheres, electrically isolated from ground, axially inside the ducts of the first tank and radially connected with the thin duct (88) drilled in each of the spheres next to closest point of rotation of the shaft, inside the sphere, a ground, perimeter around the circular motor, with electrodes in parallel and very small resistance path to ground environment, a ground connection (71) connecting the liquid from the first tank with ground; wherein the engine also comprises a control panel (72) and connection to an external source of RF energy, with capacity for an alternating current at high frequency and high electric current peak, a computer and special software which, among other functions, connects the external RF source (70) with the liquid of the second tank, when it detects the loss of electrical continuity between the tanks, electric rings (62) on the central shaft of rotation, electrical connection between the rings and the control panel on one side through their electric brushes and, on the other side, the rings are electrically connected with the coils (61) DC, and the solenoid valves (76, 84) of the hydraulic control as well as other elements in rotation, a storage tank (64) of the liquid (Hg) condensed in the perimeter of the heat exchanger (63) at the bottom of the engine, electric pumps (65) and iron pipes fixed thereto and connected from the tank to upper tanks (56, 57), a thermal starter motor (54) and a thermometer (69), tachometer (68) and level indicator condensate storage tank, connected to the control panel; wherein the engine also comprises a gear (66) fixed to the shaft, a transmission gear (55) and a gear output power shaft (67), and a foundation (73) on firm ground, of reinforced concrete on anti-vibration support.

10. The circular propulsion jet engine according to claim 9 that tangential momentum to the turning radius and therefore resulting angular momentum about the axis of the circle in rotation is due to expansion that occurs inside the combustion chambers, by stoichiometric mixtures on burning H2 and O2, inside capsules submerged in salt water at high pressure, the compressor-engine further comprising containing salt water in the upper tanks (56, 57), internal ducts (58, 59, 60, 83, 88) and combustion chambers (49), wherein the fuel capsules have a conical configuration and fuel storage tanks (94, 95), interior to the fuel capsules containing O2 and H2 in stoichiometric amounts, separated by a partition (98), a steel tip (96), closing the tank O2 and a metal plug (97), closing the H2, the computer control panel and specific software and contains a source of pulsed high voltage power, the software provided in connection pulsating source to the tank (57), when receiving the signal from the lack of electrical continuity between the tanks.

\* \* \* \* \*